(12) United States Patent
Pannell

(10) Patent No.: US 6,820,165 B2
(45) Date of Patent: Nov. 16, 2004

(54) SYSTEM AND METHOD FOR INCREASING THE COUNT OF OUTSTANDING SPLIT TRANSACTIONS

(75) Inventor: Roger D. Pannell, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 481 days.

(21) Appl. No.: 09/944,517

(22) Filed: Aug. 31, 2001

(65) Prior Publication Data
US 2002/0083256 A1 Jun. 27, 2002

Related U.S. Application Data (60) Provisional application No. 60/229,830, filed on Aug. 31, 2000, and provisional application No. 60/304,167, filed on Aug. 31, 2000.

(51) Int. Cl.[7] .............................................. G06F 13/00
(52) U.S. Cl. ........................ 710/313; 710/310; 710/311
(58) Field of Search ................................ 710/305, 306, 710/310, 311, 313, 314

(56) References Cited

U.S. PATENT DOCUMENTS

| | | |
|---|---|---|
| 5,535,345 A | 7/1996 | Fisch et al. |
| 5,553,310 A | 9/1996 | Taylor et al. |
| 5,594,882 A | 1/1997 | Bell |
| 6,098,134 A | 8/2000 | Michels et al. |
| 6,425,024 B1 * | 7/2002 | Kelley et al. .................. 710/56 |
| 6,523,140 B1 * | 2/2003 | Arndt et al. ................... 714/44 |
| 6,581,141 B1 * | 6/2003 | Kelley et al. ............... 711/154 |

OTHER PUBLICATIONS

PCI–X Addendum to the PCI Local Bus Specification, Revision 1.0, PCI Local Bus, Sep. 22, 1999, pp. 1–222.

PCI–X Addendum to the PCI Local Bus Specification, PCI Local Bus, Revision 1.0, Sep. 22, 1999, pp. 1–21, 34–39, 44–50, 58–62 and 78–84.

* cited by examiner

Primary Examiner—Glenn A. Auve (57) ABSTRACT

A system and method increases the number of split transactions that can be outstanding on an input/output (I/O) bus operating in accordance with a bus protocol, such as the Peripheral Component Interface Extended (PCI-X) specification standard. An I/O bridge that interfaces between one or more processors and one or more I/O devices coupled to the I/O bus includes a transaction initiation engine, a transaction completion engine and one or more queues for buffering information that is to be transferred onto or which has been received from the I/O bus. The I/O bridge is configured to concatenate, at least logically, a tag field and a function number field from an attribute message so as create a novel, super-tag field that the I/O bridge then associates with each bus transaction. By creating the super-tag field, the I/O bridge substantially increases the number of uniquely identified bus transactions which may be responded to with a Split Response.

15 Claims, 7 Drawing Sheets

SYSTEM AND METHOD FOR INCREASING THE COUNT OF OUTSTANDING SPLIT TRANSACTIONS

CROSS-REFERENCE TO RELATED APPLICATIONS

The present application claims priority from the following U.S. Provisional Patent Applications:

Ser. No. 60/229,830, which was filed on Aug. 31, 2000, by Sam Duncan, Dave Golden, Darrel Donaldson, Dave Hartwell, Steve Ho, Andrej Kocev, Jeff Willcox and Roger Pannell for a SYMMETRICAL MULTIPROCESSOR COMPUTER SYSTEM; and Ser. No. 60/304,167, which was filed on Aug. 31, 2000, by Roger Pannell for a SYSTEM AND METHOD FOR USING FUNCTION NUMBERS TO INCREASE THE COUNT OF OUTSTANDING SPLIT TRANSACTIONS, each of which is hereby incorporated by reference in its entirety.

BACKGROUND OF THE INVENTION

1. Field of the Invention

The present invention relates to computer systems and, more specifically, to the input/output (I/O) subsystem of a computer system.

2. Background Information

Connected to most computer systems, including symmetrical multiprocessor (SMP) systems, are a plurality of peripheral components, such as disk drives, tape drives, graphics accelerators, audio cards, network interface cards (NICs), etc. The peripheral components are typically connected to an input/output (I/O) bus operating in accordance with a bus standard, such as Industry Standard Architecture (ISA), Extended ISA (EISA), and Peripheral Components Interface (PCI) bus standards. In most computer systems, the processor bus to which the processor(s), caches and the main memory are connected often runs at a higher speed than the I/O bus. Accordingly, a separate device, referred to as an I/O bridge, is used to interface between the processor and memory which are attached to the processor bus, and the peripheral components which are attached to the I/O bus. The I/O bridge basically moves transactions, e.g., reads and writes, between the processor bus and the I/O bus.

Recently, an extension to PCI, known as PCI-X, has been developed. The PCI-X bus standard, which provides for a bus width of 64 bits and a bus frequency of 133.3 MHz, represents a significant improvement over conventional PCI. In addition to the increase in bus operating speed, the PCI-X bus standard also defines several new features. Specifically, the PCI-X standard defines a new bus transaction phase called the "attribute phase". The attribute phase uses a 36-bit attribute message which the initiator of a transaction drives onto the I/O bus immediately after the address phase. The attribute message contains several fields specifying information about the size of the transaction, the ordering of transactions, and the identity of the transaction initiator.

Figure 1:
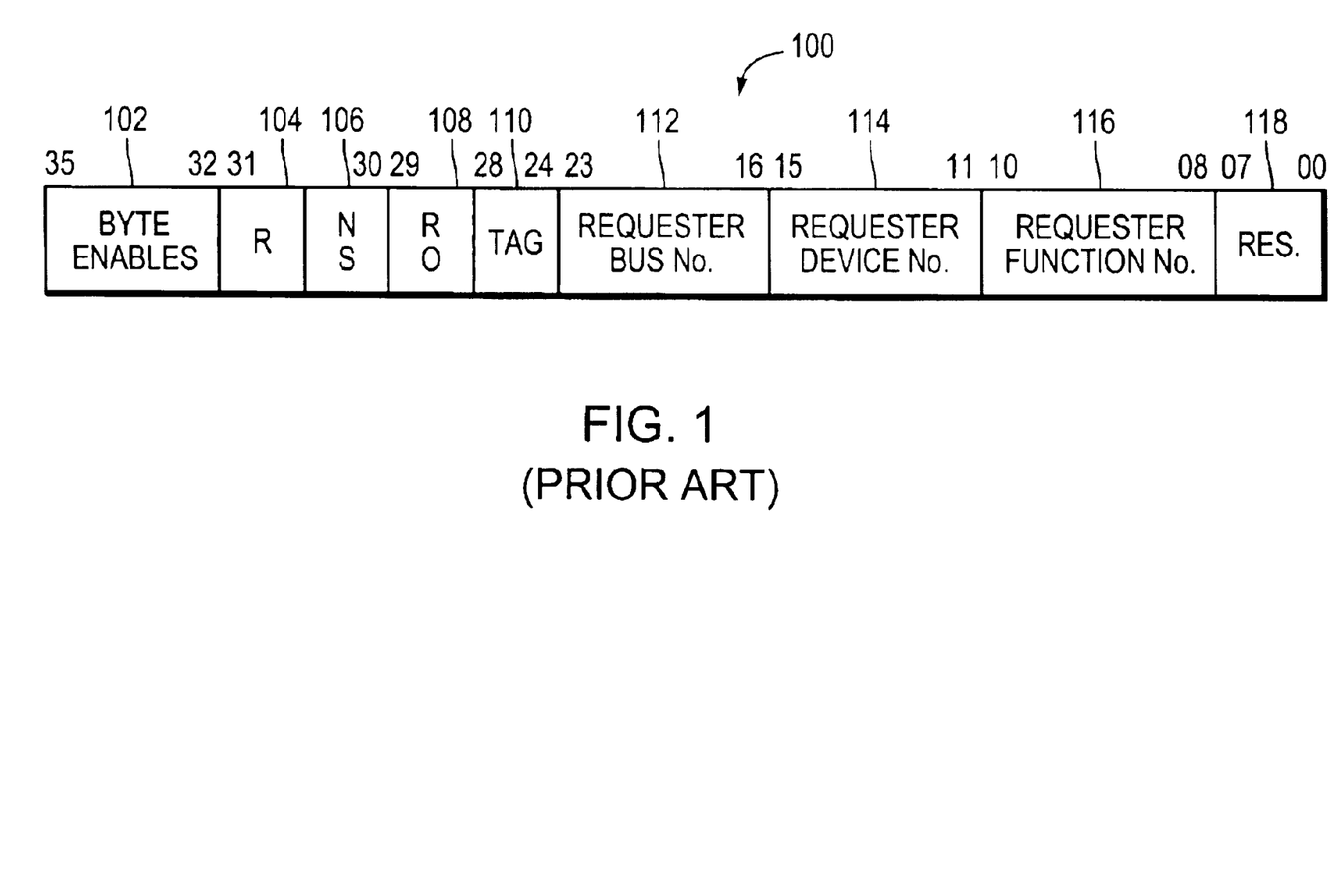
FIG. 1, previously discussed, is a highly schematic block diagram of an attribute message.

FIG. 1 is a highly schematic block diagram of a PCI-X attribute message 100 associated with a DWORD transaction. A DWORD is a 32-bit block of data aligned on four-byte boundaries. The attribute field 100 includes a 4-bit, byte enables field 102, which is set to indicate which of the four bytes of the DWORD contain valid data, a reserved (R) field 104, a no snoop (NS) field 106, a relaxed ordering (RO) field 108, and a 5-bit, tag field 110. The tag field 110 is used by the initiator of the bus transaction to uniquely identify up to 32 different sequences. A sequence is defined in the PCI-X standard as one or more transactions associated with carrying out a single, logical transfer, such as a read or write operation. The attribute message 100 further includes a requester bus number field 112, that contains the requester's bus number in case the transaction crosses more than one I/O bus, a requester device number field 114, that contains the identification (ID) number assigned to the requester, a 3-bit, requester function number field 116, that contains an ID number assigned to the particular requesting function within the device, and a reserved field 118.

The requester function number field 116 is included to support multifunction peripherals connected to the I/O bus. An example of a multifunction peripheral is a combination Ethernet controller/disk controller disposed in a single physical device. Each separate function of a multifunction peripheral is encoded, typically during fabrication, with a respective function number. Devices which do not support multiple functions, including I/O bridges, are typically encoded with a single function number, e.g., "000".

If the Ethernet controller part of the multifunction peripheral device drives an attribute message 100 onto the I/O bus, it loads its encoded function number, e.g., "000", in field 116. If the disk controller part of the peripheral drives an attribute message 100 onto the I/O bus, it loads its encoded function number, e.g., "001", in field 116. The function number field 116, among others, is used by a requesting device to help keep track of bus transactions that end up being "split" as opposed to being completed at the time they are initiated.

Specifically, the PCI-X bus standard also provides support for "Split Transactions", which allow a targeted device to delay the completion of a transaction initiated on the I/O bus, without tying up the bus or the requesting device. Suppose, for example, that a requesting device wishes to read data from a targeted device. The requesting device requests and gains control of the I/O bus. The requesting device then initiates the read transaction. As part of this process, the requesting device drives an attribute message 100 onto the I/O bus, which specifies its device number, its function number, and a selected tag value, among other information. If the targeted device is able to accept the transaction, but must delay the delivery of the data, it responds to the requesting device with a Split Response. The I/O bus can then be used to transfer other transactions by the requesting device or by other devices. When the targeted device is ready to deliver the data, it places a Split Completion transaction onto the I/O bus that includes the data. As part of the Split Completion transaction, the targeted device also provides the device number, function number and selected tag value previously specified by the requesting device so that the requesting device can match up the Split Completion transaction with its earlier read request. If the targeted device cannot complete the delivery of the data due some type of error, it returns a Split Completion Message, indicating that an error occurred.

The PCI-X bus standard represents a significant improvement over the conventional PCI standard. Nonetheless, an I/O bridge interfacing to a PCI-X bus can still constitute a bottleneck, especially in a computer system having a large number of peripheral devices. For example, the processors of an SMP computer system often move data in large, e.g., 64-byte, blocks. Suppose a given processor issues a write transaction to a peripheral device, such as a tape drive, and that the write transaction includes four 64-byte blocks of data. The processor sends each 64-byte block to the I/O bridge for delivery to the tape drive. If the tape drive and/or I/O bus can only accept DWORD transactions (i.e., 32-bit data blocks), each 64-byte block must be broken down into sixteen 32-bit DWORD blocks, which can then be individually driven onto the I/O bus.

As the tape drive can theoretically respond to each DWORD transaction with a Split Response instead of completing the write immediately, the I/O device assigns a different tag value to each DWORD. In this way, the I/O bridge can match up subsequent Split Completions with the particular DWORD being requested. Because the tag field 110 is 5-bits in length, the maximum number of split transactions that the I/O bridge can have outstanding at any given time is 32. For computer systems having only a few processors and only a few peripheral devices, this is deemed a sufficient number of outstanding split transactions.

For large computer systems, such as SMP systems, supporting large numbers of peripheral devices, however, this number has proven to be inadequate. Indeed, after receiving the second 64-byte block of data from the processor, the I/O bridge in the above example must stall the processor to prevent it from sending any further blocks of data until the tape drive completes enough DWORD transactions to free up sufficient tag values. Stalling a processor obviously reduces system performance.

SUMMARY OF THE INVENTION

Briefly, the present invention is directed to a system and method for increasing the number of split transactions that can be outstanding on an input/output (I/O) bus operating in accordance with a bus protocol, such as the Peripheral Component Interface Extended (PCI-X) specification standard. More specifically, an I/O bridge interfaces between one or more processors and memory subsystems, and one or more I/O devices coupled to the I/O bus. The I/O bridge includes a transaction initiation engine, a transaction completion engine and one or more queues for buffering information that is to be transferred onto or which has been received from the I/O bus. To initiate a bus transaction targeting a given I/O device, the transaction initiation engine generates an attribute message which it drives onto the bus. The attribute message includes a tag field and a function number field. In accordance with the invention, the transaction initiation engine concatenates, at least logically, the tag field and the function number field so as create a novel, super-tag field. For each bus transaction, the I/O bridge loads the super-tag field with a different value so as to keep track of transactions responded to with a Split Response by the targeted device. Creation of the super-tag allows the I/O bridge to support up to 256 outstanding split transactions.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
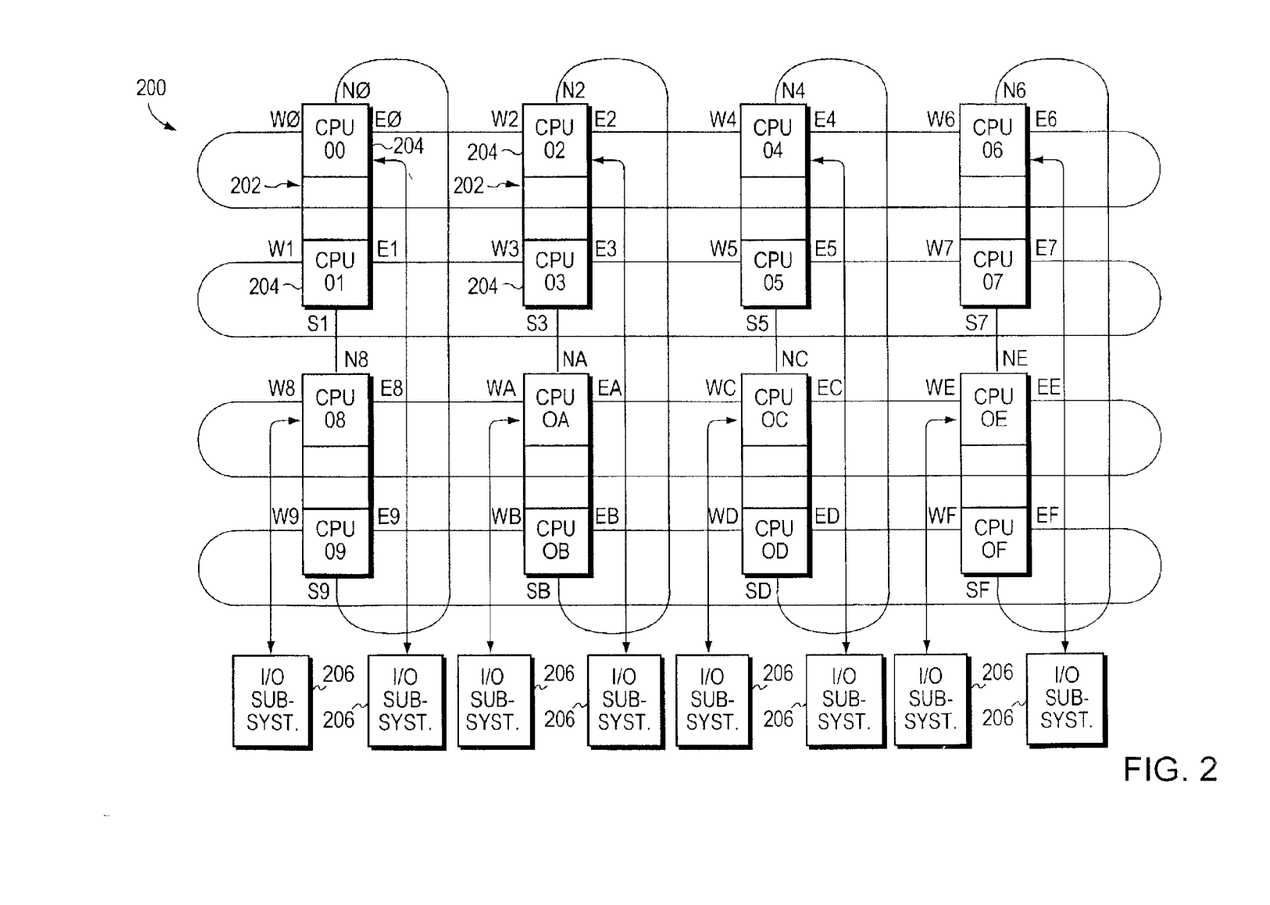
FIG. 2 is a schematic block diagram of a symmetrical multiprocessor computer system in accordance with the present invention.

FIG. 2 is a schematic block diagram of a symmetrical multiprocessor (SMP) system 200 comprising a plurality of processor modules 202 interconnected to form a two dimensional (2D) torus or mesh configuration. Each processor module 202 preferably comprises two central processing units (CPUs) or processors 204 and has connections for two input/output (I/O) ports (one for each processor 204) and six inter-processor (IP) network ports. The IP network ports are preferably referred to as North (N), South (S), East (E) and West (W) compass points and connect to two unidirectional links. The North-South (NS) and East-West (EW) compass point connections create a (Manhattan) is grid, while the outside ends wrap-around and connect to each other, thereby forming the 2D torus. The SMP system 200 further comprises a plurality of I/O subsystems 206. I/O traffic enters the processor modules 202 of the 2D torus via the I/O ports. Although only one I/O subsystem 206 is shown connected to each processor module 202, because each processor module 202 has two I/O ports, any given processor module 202 may be connected to two I/O subsystems 206 (i.e., each processor 204 may be connected to its own I/O subsystem 206).

Figure 3:
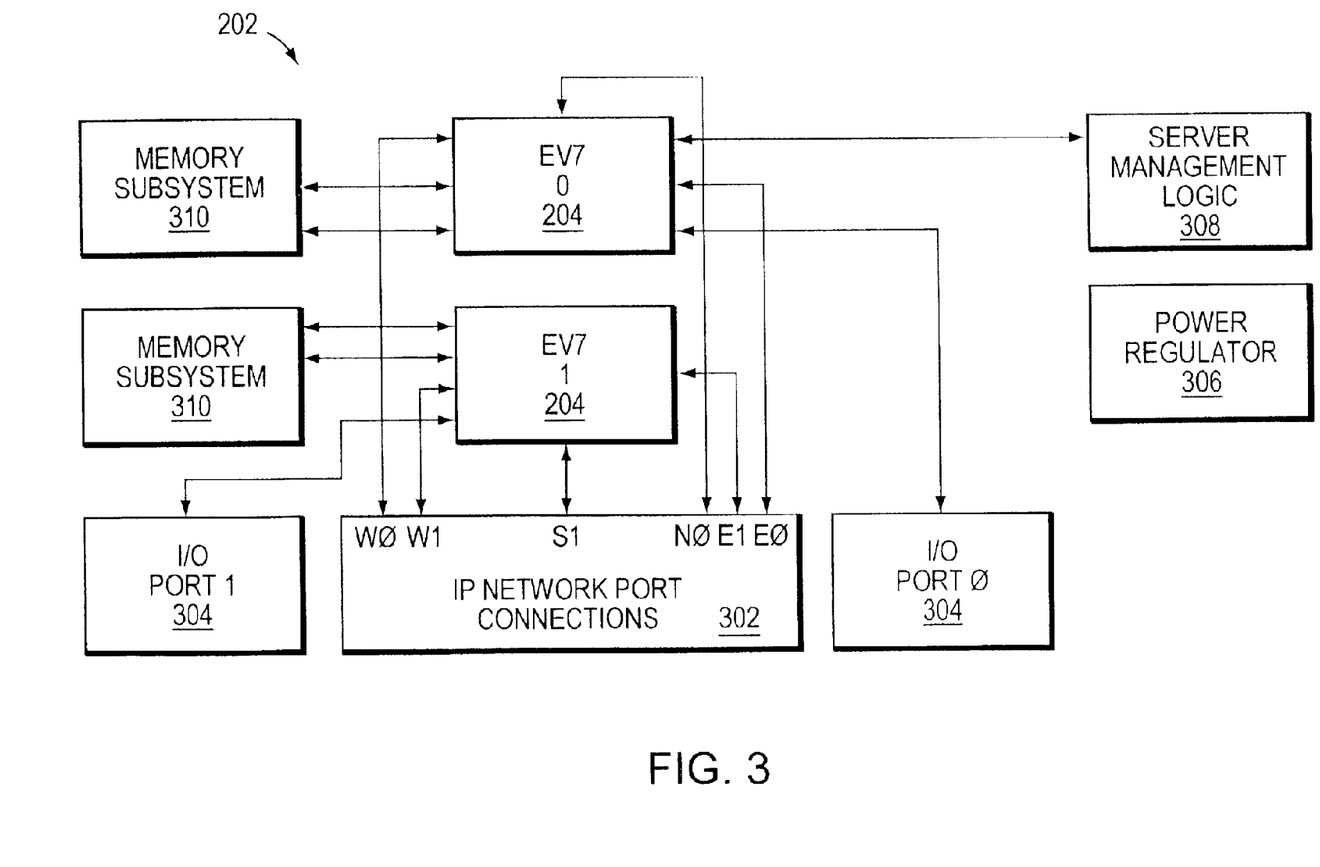
FIG. 3 is a schematic block diagram of a dual processor module of the computer system of FIG. 2.

FIG. 3 is a schematic block diagram of a dual CPU (2P) module 202. As noted, each 2P module 202 preferably has two CPUs 204 each having connections 302 for the IP ("compass") network ports and an I/O port 304. The 2P module 202 also includes one or more power regulators 306, server management logic 308 and two memory subsystems 310 each coupled to a respective memory port (one for each CPU 204). The server management logic 308 cooperates with a server management system to control functions of the computer system 200 (FIG. 2), while the power regulators 306 control the flow of electrical power to the 2P module 202. Each of the N, S, E and W compass points along with the I/O and memory ports, moreover, preferably use clock-forwarding techniques, i.e., the forwarding of clock signals with the data signals, to increase data transfer rates and reduce skew between the clock and data.

Each CPU 204 of a 2P module 202 is preferably an "EV7" processor from Compaq Computer Corporation of Houston Texas, that includes part of an "EV6" processor as its core together with "wrapper" circuitry that comprises two memory controllers, an I/O interface and four network ports. In the illustrative embodiment, the EV7 address space is 44 physical address bits and supports up to 256 processors 204 and 256 I/O subsystems 206. The EV6 core preferably incorporates a traditional reduced instruction set computer (RISC) load/store architecture. In the illustrative embodiment described herein, the EV6 core is an Alpha® 21264 processor chip manufactured by Compaq Computer Corporation with the addition of a 1.75 megabyte (MB) 7-way associative internal cache and "CBOX", the latter providing integrated cache controller functions to the EV7 processor. The EV7 processor also includes a "RBOX" that provides integrated routing/networking control functions with respect to the compass points, and a "ZBOX" that provides integrated memory controller functions for controlling the memory subsystem 310. However, it will be apparent to those skilled in the art that other types of processor chips may be advantageously used.

Each memory subsystem 310 may be and/or may include one or more conventional or commercially available dynamic random access memory (DRAM), synchronous DRAM (SDRAM), double data rate SDRAM (DDR-SDRAM) or Rambus DRAM (RDRAM) memory devices.

Figure 4:
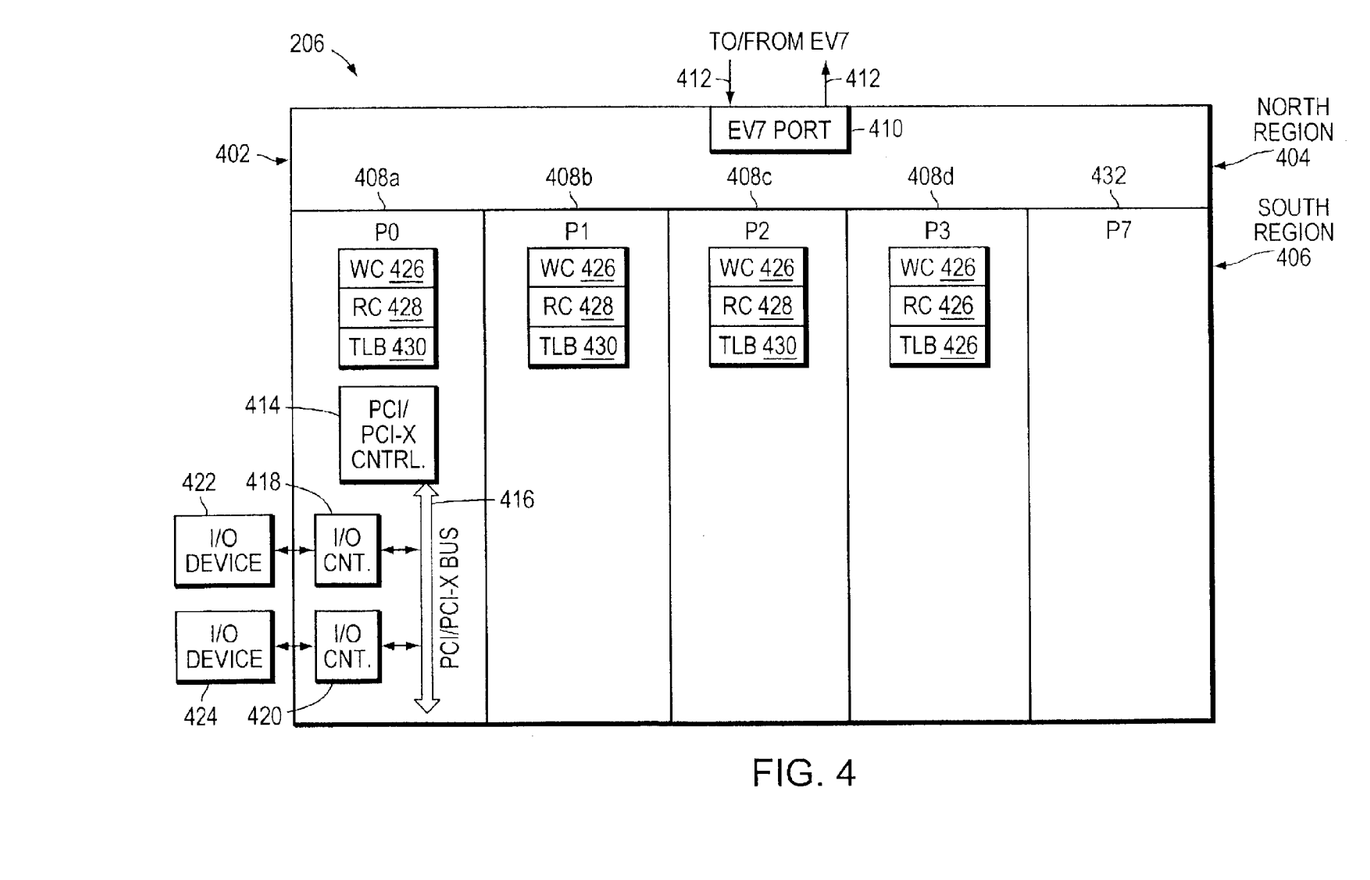
FIG. 4 is a schematic block diagram of an I/O subsystem of the computer system of FIG. 2.

FIG. 4 is a schematic block diagram of an I/O subsystem 206. The subsystem 206 includes an I/O bridge 402, which may be referred to as an "IO7", that constitutes a fundamental building block of the I/O subsystem 206. The IO7 402 is preferably implemented as an application specific integrated circuit (ASIC). As described above, each EV7 processor 204 includes one I/O port 304; however, there is no requirement that each processor 204 be connected to an I/O subsystem 206.

The IO7 402 comprises a North circuit region 404 that interfaces to the respective EV7 processor 404 and a South circuit region 406 that includes a plurality of I/O data ports 408a–d (P0–P3) that preferably interface to standard I/O buses. An EV7 port 410 of the North region 404 couples to the EV7 processor 204 via two unidirectional, clock forwarded links 412. In the illustrative embodiment, three of the four I/O data ports 408a–c interface to the well-known Peripheral Component Interface-Extended (PCI-X) bus standard, which is hereby incorporated by reference in its entirety, while the fourth data port 404d interfaces to an Accelerated Graphics Port (AGP) bus standard. More specifically, ports P0–P2 include a PCI-X controller, such as controller 414 at port P0, which is coupled to and controls a respective PCI-X bus, such as bus 416. Attached to bus 416 may be one or more I/O controller cards, such as controllers 418, 420. Each I/O controller 418, 420, in turn, interfaces to and is responsible for one or more I/O devices, such as I/O devices 422 and 424, which may or may not be multifunction devices. Port P3 may include an AGP controller (not shown) rather than a PCI-X controller for controlling an AGP bus.

The South region 306 further includes an interrupt port 432 (P7). The interrupt port P7 collects interrupts, such as level sensitive interrupts (LSIs) and for message signaled interrupts (MSIs), and sends these interrupts to North region for transmission to and servicing by the processors 104 of the EV7 mesh.

A cache coherent domain of the SMP system 200 preferably extends into the IO7 402 and, in particular, to I/O buffers or caches located within each I/O data port 408. Specifically, the cache coherent domain extends to a write cache (WC) 426, a read cache (RC) 428 and a translation look-aside buffer (TLB) 430 located within each I/O data port 408. The WC 426 and RC 428, as well as TLB 466 function as coherent buffers. The WC 426 buffers data that was received by the IO7 402 from one or more I/O devices and is to be written to the EV7 mesh, e.g., to a processor cache and/or one or more memory subsystems 310. The RC 428 buffers data that was received by the IO7 402 from the EV7 mesh and is to be read by one or more I/O devices. In the preferred embodiment, the WC 426 and RC 428 is each configured to buffer up to 28 64-byte blocks of data.

Figure 5:
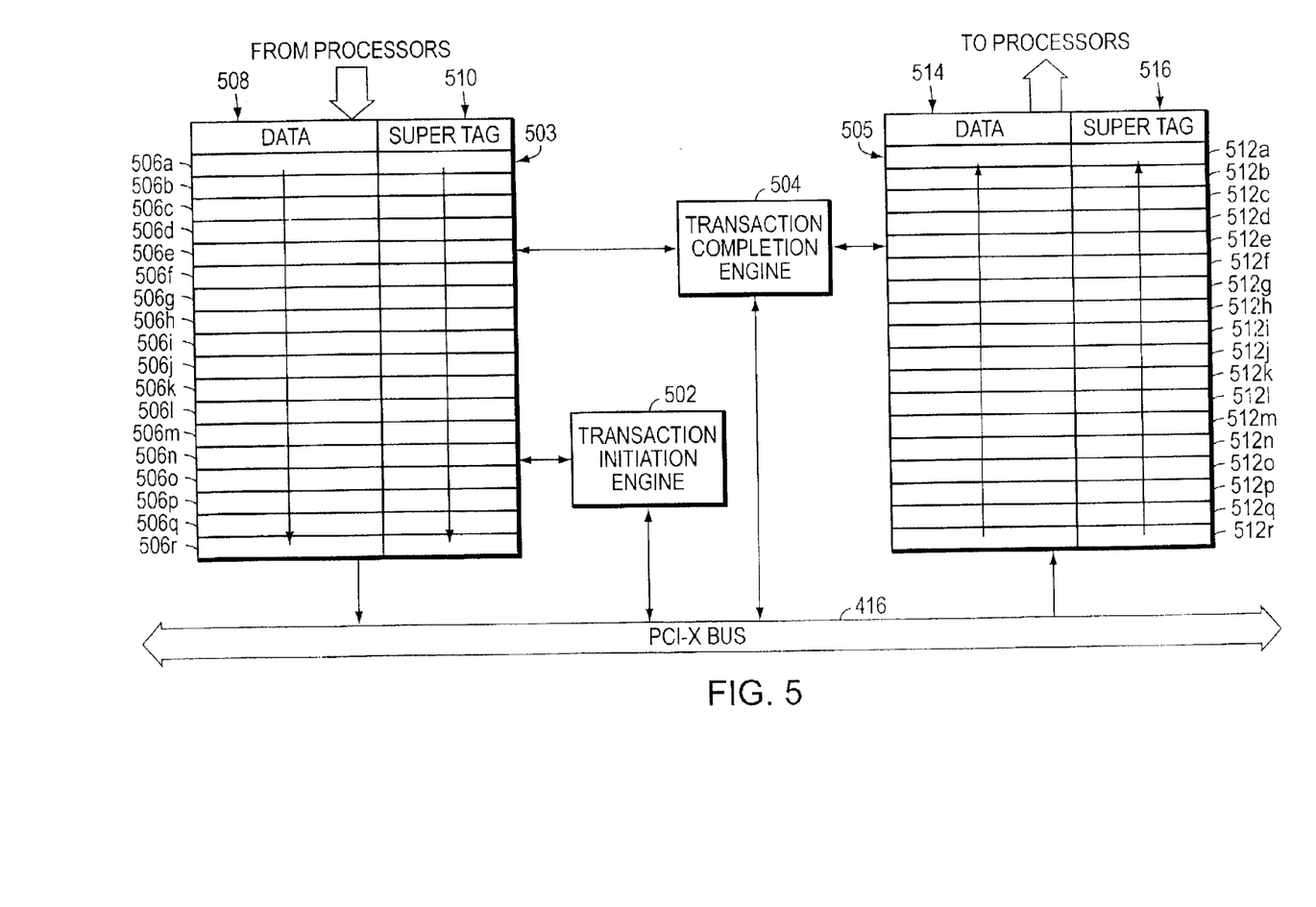
FIG. 5 is a schematic, partial block diagram of a data port of the I/O subsystem of FIG. 4.

FIG. 5 is partial block diagram of a port, e.g., P0, of an IO7 402 in greater detail. The port P0 includes a transaction initiation engine 502 that is operably coupled to a write buffer 503, and a transaction completion engine 504 that is operably coupled to the write buffer 503 and to a read buffer 505. The write buffer 503 includes a plurality of entries 506a–r, and each entry contains a data space 508 for buffering data received from the EV7 mesh and a corresponding super tag space 510 which, as described below, is loaded by the transaction initiation engine 502 with a value that it associates with the corresponding data. The read buffer 505 also includes a plurality of entries 512a–r and each entry contains a data space 514 for buffering data received from the I/O devices and a corresponding super tag space 516 which, as also described below, is loaded with a value selected by the transaction initiation or completion engines 502, 504 that the engine associates with the corresponding data. Each entry of both the write and read buffers 503, 505 may further include spaces to buffer command and address information for the respective data.

Unlike the WC 426 and RC 428 described above, the write and read buffers 503, 505 are preferably not part of the cache coherent domain of the SMP system.

Suppose a processor 104 of the EV7 mesh wishes to write eight 64-byte blocks of data to a selected I/O device, e.g., I/O device 424, which may be a tape drive. The processor 104 generates a write transaction which includes the address into which the data is to be written and the eight blocks of data. The processor 104 then sends the write transaction to the IO7 402 to which device 424 is connected. The write transaction is received at the IO7's EV7 port 410 and is handed down from the North region 404 to port P0 to which device 424 is connected. As each 64-byte block is received, the transaction initiation engine 502 divides it into DWORD size, i.e., 32-bit blocks, and places each DWORD into the data space 508 of a respective entry 506 of write buffer 503. For each DWORD of data being placed in an given entry, e.g., entry 506g, the transaction initiation engine 502 also generates a respective super tag value.

Figure 6:
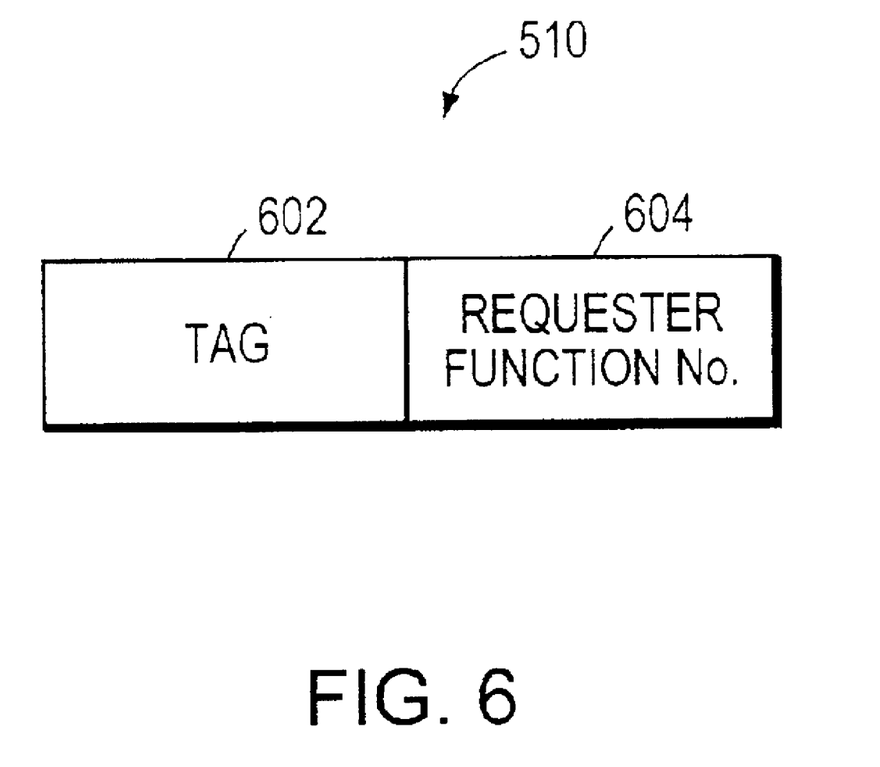
FIG. 6 is a schematic block diagram of a data structure in accordance with the present invention.

FIG. 6 is a highly schematic block diagram of a super tag 510 in accordance with a preferred embodiment of the present invention. The super tag includes a 5-bit tag field 602 that has been concatenated, at least logically, with a 3-bit requester function number field 604 so as to generate an 8-bit super tag 510. Creation of the 8-bit super tag 510 allows the transaction initiation engine 502 to assign unique super tag values to 256 DWORDs, which is eight times as many as supported by the prior art designs. The first DWORD, for example, may be assigned super tag "00000 000", the second DWORD may be assigned super tag "00000 001", the third DWORD may be assigned super tag "00000 010" and so on up to a super tag of "11111 111".

The transaction initiation engine 502 then gains control of the PCI-X bus 416 in a conventional manner in order to forward the write transaction to device 424. As part of the bus acquisition process, the transaction initiation engine 502 drives an attribute message 100 onto the PCI-X bus 416 for receipt and processing by the targeted I/O device, i.e., device 424. Suppose the port P0 plans on moving the DWORD from entry 506g onto the PCI-X bus 416. As part of the attribute phase of the bus transaction, the transaction initiation engine 502 loads the tag field 110 of the attribute message 100 with the value from the tag field 602 of the super tag 510 that is associated with entry 506g. In other words, engine 502 loads tag field 602 with the five higher order bits of the super tag 510. Engine 502 also loads the requester function number field 116 with the value from the requester function number field 604 of the super tag 510. In other words, engine 502 loads field 604 with the three lower order bits of the super tag 510. That is, engine 502 does not use the I/O bridge's encoded function number in field 116, even assuming IO7 402 is encoded with a single function number.

If device 424 is unable to accept the data, it responds with a Retry indication, requiring port P0 to retry the transaction at a later time. If the device 424 can accept but not process the data, it signals a Split Response to the IO7 402. The device 424 also stores the information contained in the attribute message 100 that it received from port P0. Later on, after device 424 has successfully processed the write data, it sends a Split Completion Message over bus 416 to port P0. As part of the Split Completion Message, device 424 supplies the tag, requester bus number, requester device number and requester function number that it had stored from the attribute message 100 previously sent by port P0. The transaction completion engine 504 concatenates the received tag and requester function number to generate a super tag value. Engine 504 then performs a look-up in the write buffer 503 for the entry whose stored super tag from space 510 matches the super tag value generated from the Split Completion Message. As the data was successfully processed by device 424, engine 504 clears the data from space 508 of this entry, e.g., entry 506g, thereby making the entry and the respective super tag free for use with some other transaction.

If the Split Completion Message from device 424 signals some error in its processing of the data, the port P0 may try and resend the data to device 424.

The super tag of the present invention can also be used in support of read transactions that are initiated by the EV7 mesh and directed to a peripheral device. Suppose, for example, that a given processor 104 of the EV7 mesh wishes to read data from a peripheral device connected to a particular IO7 402. The processor 104 sends a read transaction specifying the address(es) containing the desired data to the IO7 402. The IO7 402, in turn, issues a series of reads onto the PCI-X bus 416 each of which is assigned a different super tag value 510. Each of these super tag values 510, moreover, preferably corresponds to an entry of the read buffer 505. More specifically, as part of each read, the transaction initiation engine 502 sends an attribute message 100 onto the PCI-X bus 416. The transaction initiation engine 502 loads the five higher order bits from a selected one of the assigned super tag values into the tag field 110 and the three lower order bits into requester function number field 116 of the attribute message 100.

If the targeted peripheral device cannot process the read transaction, it may respond with a Retry indication, requiring the IO7 402 to retry the transaction at a later time. If the targeted device can accept the transaction but must delay its delivery of the requested data, it signals a Split Response, and stores the information contained in the attribute message 100 that it received from port P0. Later, when the device is ready to deliver the requested data, it gains control over the PCI-X bus 416, and issues a Split Completion transaction that includes the data. The Split Completion transaction also includes the tag value and the requester function number value that the device had stored from the attribute message 100 previously sent by port P0. The transaction completion engine 504 concatenates these values to generate a corresponding super tag value 510 which it then uses to identify a corresponding entry, e.g., entry 512m, into which the corresponding data is stored before transmission into the EV7 mesh. If, instead, the targeted device is unable to complete delivery of the requested data due to some type of error, it returns a Split Completion Message to port P0, which returns the error status to the respective processor.

With the present invention, the IO7 402 can have up to 256 outstanding split transactions (which can be any combination of reads and writes) before having to stall the processor 104 from issuing additional reads or writes. This represents a significant improvement over the prior art systems which were limited to at most 32 outstanding split transactions.

Figure 7:
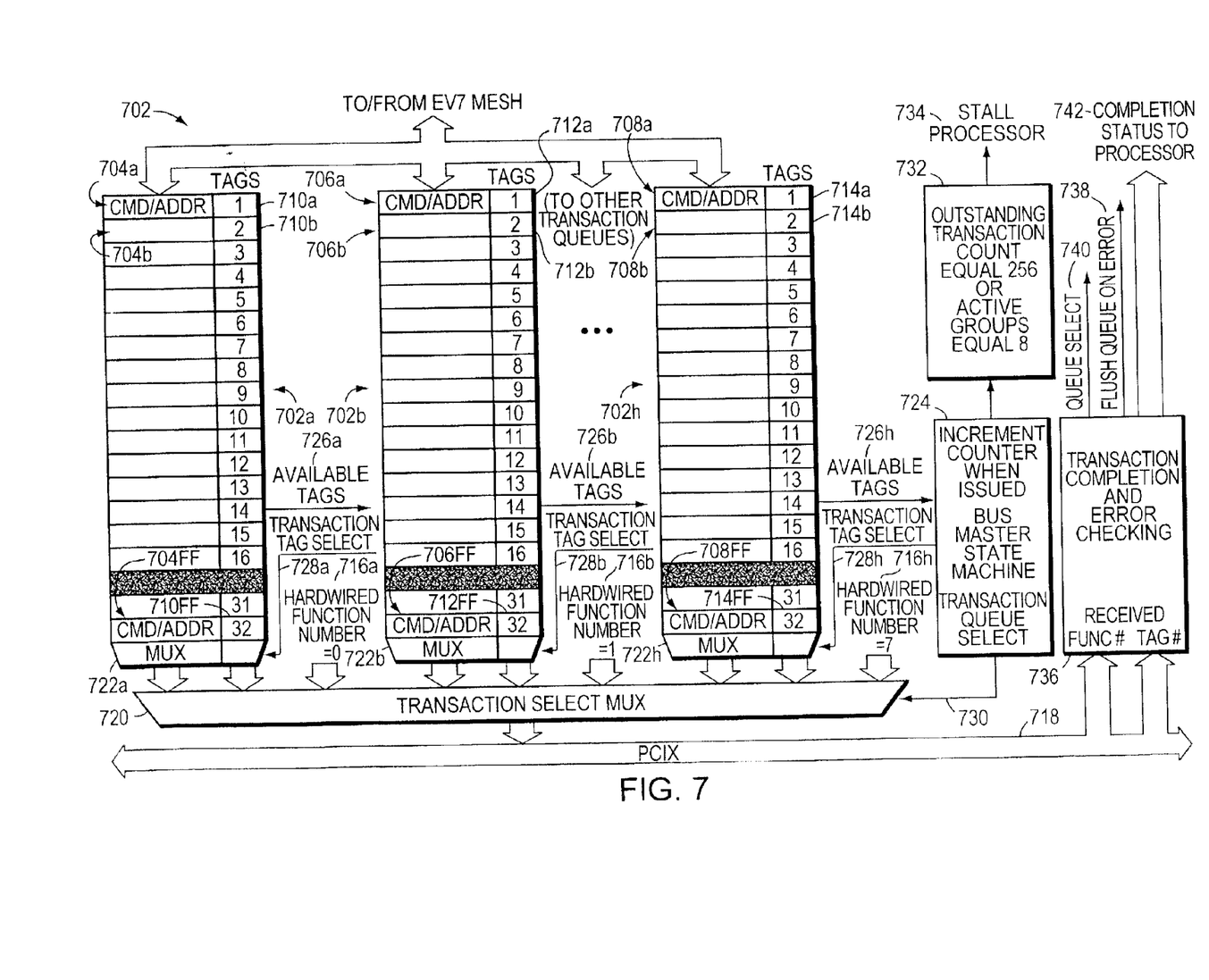
FIG. 7 is a schematic, partial block diagram of a data port of the I/O subsystem of FIG. 4 in accordance with another embodiment of the present invention.

FIG. 7 is a highly schematic, partial block diagram of a data port of an IO7 700 configured in accordance with another embodiment of the present invention. The IO7 700 includes a plurality of, e.g., eight, transaction queues 702a–702h. Each queue 702 has a plurality of, e.g., 32, entries for buffering information, such as command (Cmd) and address (Addr) information. For example, queue 702a has entries 704a–704ff, queue 702b has entries 706a–706ff, and queue 702h has entries 708a–708ff. The queue entries may also store data. Associated with each queue entry is a corresponding tag. For example, queue 702a has tags 710a–710ff, queue 702b has tags 712a–712ff, and queue 702h has tags 714a–714ff. Transaction queues 702a–702h are preferably not part of the cache coherent domain of the SMP system.

Each of the eight transaction queues 702a–702h is also associated with a particular function number 716a–h. The function numbers may be hardwired or encoded during fabrication of the IO7 402. Alternatively, they may be read out of one or more control and status registers (CSRs) for assignment to the queues 702 during initialization of the IO7 700. Each transaction queue 702 is configured to receive and/or send information to the EV7 mesh. Each transaction queue 702 is also coupled to an I/O bus 718 through a transaction select multiplexer (mux) 720. In particular, each queue 702 includes its own mux 722a–722h for providing a selected queue entry to the transaction select mux 720 which, in turn, provides the selected transaction to the I/O bus 718. Connected to the bus 718, which is configured to operate in accordance with the PCI-X bus specification standard, are a plurality of peripheral devices (not shown).

The IO7 700 further includes a bus master state machine 724 that is operably coupled to each transaction queue 702a–702h and to the transaction select mux 720. In particular, the bus master state machine 724 receives information from the queues regarding available tags, i.e., available or free entries, as indicated by arrows 726a–726h, and operates both the queue-specific multiplexers 722a–722h and the transaction select mux 720, as indicated by arrows 728a–728h and arrow 730, so as to drive the information buffered at a selected queue entry onto the PCI-X bus 718.

A transaction logic device 732 is updated via the bus master state machine 724 to keep track of the number of remaining, available tag identifiers. As transactions are received by the EV7 mesh, the bus master state machine 724 selects one of the eight transaction queues 702a–702h in which to buffer the respective transaction or portion thereof. Each transaction or portion thereof received from the EV7 mesh is placed in a respective transaction queue entry and is thus assigned a respective tag value. When the number of available entries from all eight transaction queues 702a–702h is exhausted, processing of subsequent transactions is delayed and a STALL state 734 is issued to the processor(s) of the EV7 mesh.

However, as can be appreciated by one skilled in the relative art, up to 256 outstanding Split Transactions can be accommodated by the configuration shown before a stall situation is encountered.

The IO7 700 further includes transaction completion and error checking logic 736 that is coupled to the I/O bus 718. Logic 736 is also operably coupled to the transaction queues 702a–702h as indicated by the flush_queue_on_error and queue_select signals 738, 740. Logic 736 is also configured to provide completion status information to the processors of the EV7 mesh, as indicated by arrow 742.

When the information from a selected entry of a queue, e.g., entry 706a of queue 702b, is to be driven onto the bus 718 as part of a write transaction, the bus master state machine 724 first drives an attribute message 100 (FIG. 1) onto the bus 718. In the tag field 110, the state machine 724 loads the tag value assigned to the selected entry, e.g., tag value "1". In the requester function number field 116, the state machine loads the function number assigned to the respective queue, e.g., function number "1". If the targeted device can accept but not process the data, it responds with a Split Response and stores the tag and function number values. Later after it processes the received data, the device returns a Split Completion Message which includes the tag and function number values. These values are received by the transaction completion logic 736 which uses them to index to a specific queue and a specific entry of that queue, e.g., entry 706a of queue 702b, which is then cleared.

For split read transactions, the device issues a Split Completion transaction including the requested data and the previously provided tag and requester function number values. The transaction completion logic 736 utilizes these values to index to a queue entry into which it buffers the received data. Once all of the requested data has been received, it can be sent to the EV7 mesh.

If the transaction completion logic 736 receives a Split Completion Message signaling an error status or it detects an error in the received tag and function values, it may issue the flush_queue signal 738.

In the illustrated embodiment of FIG. 7, a function number of "0" is assigned to transaction queue 702a, a function number of "1" is assigned to queue 702b and a function number of "7" is assigned to queue 702h. Those skilled in the art will recognize that function numbers "2" through "6" are assigned to their own queues (not shown). As noted above, the function numbers may be assigned at fabrication or during initialization and typically will not change during transaction processing.

It should be understood that the present invention may be used with other attribute messages, such as "Burst" and "Type 0" attribute messages.

It should also be understood that the transaction initiation and completion engines 502, 504 of FIG. 5 and the state machine 724 and logic 736 of FIG. 7 can be combined into a single engine or state machine component.

It should be further understood that the IO7 may have a single large queue for buffering information.

The foregoing description has been directed to specific embodiments of the present invention. It will be apparent, however, that other variations and modifications may be made to the described embodiments, with the attainment of some or all of their advantages. For example, the present invention could be implemented in single processor computer systems. Therefore, it is the object of the appended claims to cover all such variations and modifications as come within the true spirit and scope of the invention.

What is claimed is:

1. In a computer system having one or more processors and one or more peripheral devices connected to an Input/Output (I/O) bus, an I/O bridge coupled to the I/O bus and configured to interface between the one or more processors and the one or more peripheral devices, the I/O bridge comprising:
   a queue for buffering information received from the one or more processors; and
   a transaction engine operably coupled to the queue, the transaction engine configured to place information buffered at the queue onto the I/O bus for receipt by a targeted peripheral device,
   wherein the transaction engine:
      generates an attribute message that includes a tag field and a requester function number field,
      loads the tag field with a selected value,
      loads the requester function number field with a selected one of a plurality of values, and
      places the attribute message including the selected tag and requester function number values onto the I/O bus for receipt by the targeted I/O device.

2. The I/O bridge of claim 1 wherein the transaction engine logically concatenates the tag field and the requester function number field of the attribute message to create a super tag value for use in tracking transactions placed on the I/O bus.

3. The I/O bridge of claim 2 wherein the super tag ranges from binary "00000000" to binary "11111111".

4. The I/O bridge of claim 1 wherein the queue has a plurality of entries for buffering the information and each queue entry is associated with a corresponding tag value and a corresponding requester function number value.

5. The I/O bridge of claim 4 wherein, in response to a Split Completion Message containing a tag value and a requester function number value, the transaction engine uses the received tag and requester function number values to identify a corresponding queue entry and clears the identified entry.

6. The I/O bridge of claim 5 wherein the I/O bus operates in substantial compliance with the Peripheral Component Interface Extended (PCI-X) specification standard.

7. The I/O bridge of claim 4 wherein the transaction engine is further configured to place information received from a peripheral device along with a Split Completion transaction that specifies a tag value and a requester function number value into the queue entry associated with the specified tag and request function number values.

8. The I/O bridge of claim 7 wherein the information buffered at the queue comprises at least one of command, address and data, and the command may be read or write.

9. The I/O bridge of claim 1 wherein the queue includes a read buffer for buffering data that was received from a peripheral device and a write buffer for buffering information that is to be provided to a targeted peripheral device.

10. The I/O bridge of claim 1 wherein the I/O bus operates in substantial compliance with the Peripheral Component Interface Extended (PCI-X) specification standard.

11. A method for use in a computer system having one or more processors, one or more memory subsystems, and one or more peripheral devices connected to an Input/Output (I/O) bus, the method comprising the steps of:
   providing at least one queue having a plurality of entries for buffering information received from or to be sent to a targeted peripheral device;
   associating each queue entry with a selected tag value and with one of a plurality of selected requester function number values;
   buffering information received from a processor or a memory subsystem in a selected queue entry;
   generating an attribute message that includes a tag field and a requester function number field;
   loading the tag field of the attribute message with the tag value associated with the selected queue entry;
   loading the requester function number field of the attribute message with the requester function number value associated with the selected queue entry; and
   placing the attribute message including the tag and requester function number values onto the I/O bus for receipt by the targeted I/O device.

12. The method of claim 11 further comprising the steps of:

receiving a Split Completion transaction from a targeted peripheral device specifying a tag value and a requester function number value and including data;

utilizing the received tag and requester function number values as an index to identify a corresponding queue entry; and buffering the data received from the targeted peripheral device at the identified queue entry.

13. The method of claim 11 further comprising the step of logically concatenating the tag field and the requester function number field of the attribute message to create a super tag value for use in tracking transactions placed on the I/O bus, wherein the super tag ranges from binary "00000000" to binary "11111111".

14. The method of claim 13 wherein the I/O bus operates in substantial compliance with the Peripheral Component Interface Extended (PCI-X) specification standard.

15. The method of claim 14 wherein the information buffered at the queue comprises at least one of command, address and data, and the command may be read or write.

* * * * *